United States Patent [19]

Cohn et al.

[11] Patent Number: 4,556,960
[45] Date of Patent: Dec. 3, 1985

[54] ADDRESS SEQUENCER FOR OVERWRITE AVOIDANCE

[75] Inventors: Martin Cohn, Arlington; Terry A. Welch, Concord, both of Mass.

[73] Assignee: Sperry Corporation, New York, N.Y.

[21] Appl. No.: 449,084

[22] Filed: Dec. 13, 1982

[51] Int. Cl.⁴ .......................... G06F 9/38; G06F 11/10
[52] U.S. Cl. ........................................ 364/900; 371/11
[58] Field of Search ... 364/200 MS File, 900 MS File; 371/11, 37; 365/230

[56] References Cited

U.S. PATENT DOCUMENTS 4,064,558 12/1977 Hughes et al. ...................... 364/900

OTHER PUBLICATIONS

IBM Technical Disclosure Bulletin, vol. 25, No. 11A, Apr. 1983, pp. 5836–5838.
IBM Technical Disclosure Bulletin, vol. 26, No. 6, Nov. 1983, pp. 2751–2752.

*Primary Examiner*—James D. Thomas
*Assistant Examiner*—Thomas Lee
*Attorney, Agent, or Firm*—Howard P. Terry

[57] ABSTRACT

An address sequencer utilizes binary words generated by Exclusive-OR addition of Gray code words to linear code words to produce a sequence of computer or memory addresses such that the addresses whose indices lie within a selected range of the index of a particular address are a predetermined Hamming distance from that address, whereby the possibility of recent data being overwritten is reduced.

24 Claims, 2 Drawing Figures

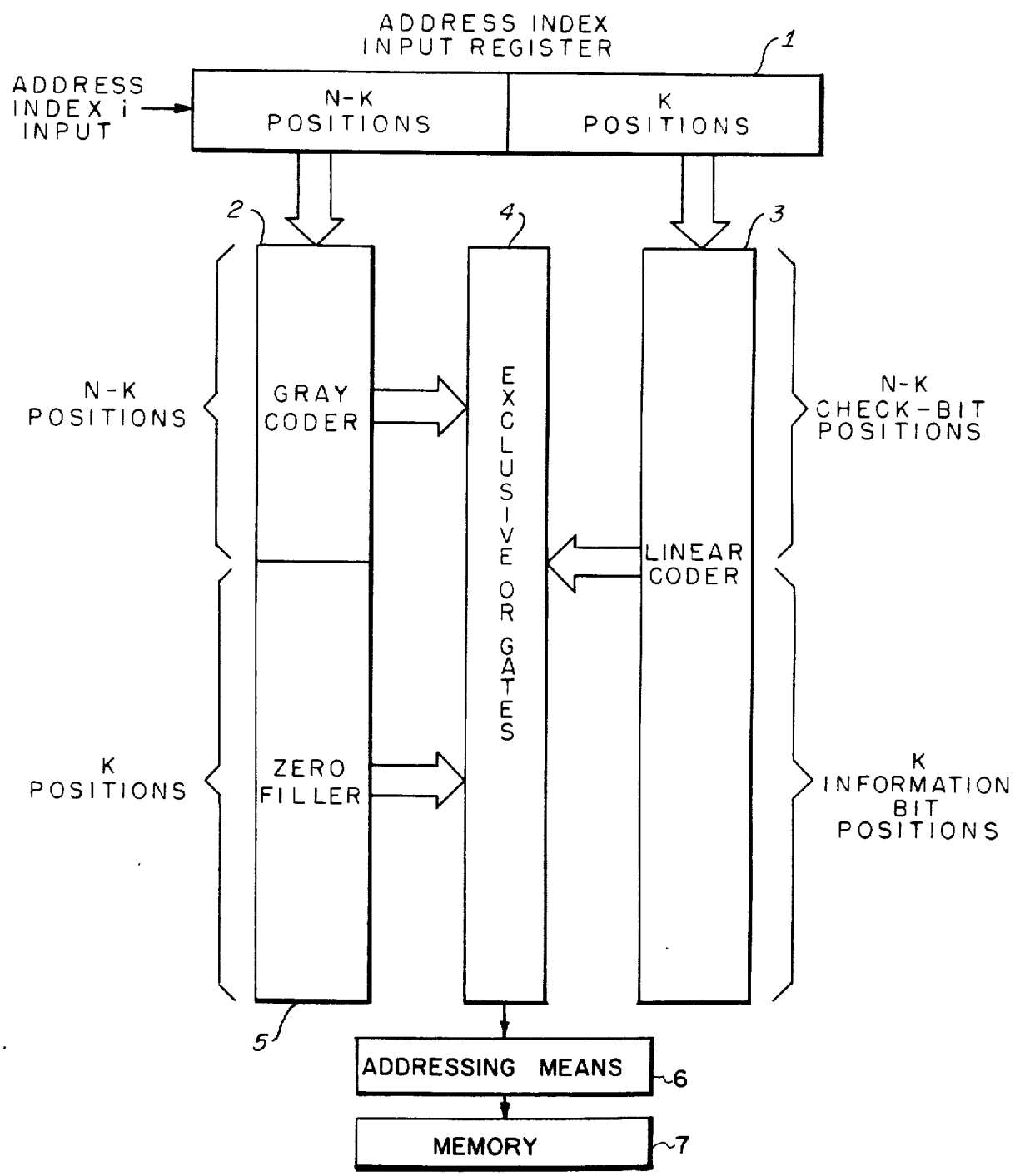
F I G. 1.

| | | | | | | |
|---|---|---|---|---|---|---|
| 0 | | 0 | 0 | 0 | 0 | 0 |
| 1 | | 0 | 0 | 0 | 0 | 1 |
| 2 | | 0 | 0 | 0 | 1 | 0 |
| 3 | | 0 | 0 | 0 | 1 | 1 |
| 4 | | 0 | 0 | 1 | 0 | 0 |
| 5 | | 0 | 0 | 1 | 0 | 1 |
| 6 | | 0 | 0 | 1 | 1 | 0 |
| 7 | | 0 | 0 | 1 | 1 | 1 |
| 8 | | 0 | 1 | 0 | 0 | 0 |
| 9 | | 0 | 1 | 0 | 0 | 1 |
| 10 | | 0 | 1 | 0 | 1 | 0 |
| 11 | | 0 | 1 | 0 | 1 | 1 |
| 12 | | 0 | 1 | 1 | 0 | 0 |
| 13 | | 0 | 1 | 1 | 0 | 1 |
| 14 | | 0 | 1 | 1 | 1 | 0 |
| 15 | | 0 | 1 | 1 | 1 | 1 |
| 16 | | 1 | 0 | 0 | 0 | 0 |
| 17 | | 1 | 0 | 0 | 0 | 1 |
| 18 | | 1 | 0 | 0 | 1 | 0 |
| 19 | | 1 | 0 | 0 | 1 | 1 |
| 20 | | 1 | 0 | 1 | 0 | 0 |
| 21 | | 1 | 0 | 1 | 0 | 1 |
| 22 | | 1 | 0 | 1 | 1 | 0 |
| 23 | | 1 | 0 | 1 | 1 | 1 |
| 24 | | 1 | 1 | 0 | 0 | 0 |
| 25 | | 1 | 1 | 0 | 0 | 1 |
| 26 | | 1 | 1 | 0 | 1 | 0 |
| 27 | | 1 | 1 | 0 | 1 | 1 |
| 28 | | 1 | 1 | 1 | 0 | 0 |
| 29 | | 1 | 1 | 1 | 0 | 1 |
| 30 | | 1 | 1 | 1 | 1 | 0 |
| 31 | | 1 | 1 | 1 | 1 | 1 |

F I G. 2.

ADDRESS SEQUENCER FOR OVERWRITE AVOIDANCE

BACKGROUND OF THE INVENTION

1. Field of the Invention

The present invention relates generally to the sequential allocation of addresses in a computer memory, and more specifically, to such an allocation which mitigates the damage resulting from hardware or software errors by reducing the possibility of relatively recent data being overwritten.

2. Description of the Prior Art

Data is stored or written in selected addresses in a digital computer's memory. When a hardware or software error occurs, data may be conveyed to an unintended memory address. If such address is already storing information, such information will be lost when it is overwritten by the misdirected data.

Addressing mechansisms route data serially to chosen locations in computer memory. Data meant for one address may be directed, as a result of computer error, to another address which is proximate the former in the sequence. This proximate but erroneously selected address may contain relatively recent information which will be corrupted by the misguided data. Such recent information may well be quite valuable, and its loss, therefore, significant.

Accordingly, there is a need for an apparatus that allocates data to a sequence of addresses such that in the event of computer error that routes data to an unintended address, more recent and therefore, generally, more valuable information will not likely be overwritten.

SUMMARY OF THE INVENTION

An object of the present invention is to generate a sequence of addresses such that the possibility of the addressing means routing misallocated data to memory locations containing relatively recent data is reduced.

An address sequencer embodying the principles of the present invention includes a means for generating a sequence of binary words comprising a repeating cycle of $2^k$ linear (n, k, d) code words. Each linear code word contains k data bits and n−k check bits, the k data bits occupying the same positions in each word. The invention further includes a means for generating a sequence of binary words comprising words of a Gray code of dimension n−k. An individual Gray code word occurs consecutively $2^k$ times, and distinct Gray code words occur in the order in which they appear in the Gray code. A zero filler generates a sequence of binary words, each containing k zero bits. A means for performing Exclusive-OR addition is coupled to the linear code generator, the Gray code generator and the zero filler. The Gray code words are added to, respectively, the n−k check bits of the linear code words, and the binary words containing k zeros are added to, respectively, the k data bits of the linear code words. The n dimension binary words resulting from the additions correspond to addresses.

In a preferred embodiment of the invention, an address index input register is loaded with address indices in binary format. A gray coder utilizes the higher order n−k bits of the register to generate Gray code words. A linear coder utilizes the lower order k bits of the register as data bits from which it generates linear (n, k, d) code words by appending n−k check bits thereto.

BRIEF DESCRIPTION OF THE DRAWINGS

FIG. 1 is a schematic diagram of an address sequencer configured in accordance with a preferred embodiment of the invention.

FIG. 2 is a sequence of address indices in binary form which exhibits the useful properties of this input format.

DESCRIPTION OF THE PREFERRED EMBODIMENT

Several preliminary definitions are necessary for an understanding of the present invention:

Binary Word

A Binary Word is a sequence of binary digits (0's or 1's) of finite length (dimension). For example, 01011101 is a binary word of dimension 8.

Hamming Weight

Hamming weight is the number of ones in a binary word. For example, the Hamming weight of 01011101 is 5, since it possesses 5 ones.

Hamming Distance

The Hamming distance between two binary words of equal dimension is the number of positions wherein the words differ. For example, the Hamming distance between 10100111 and 01101011 is four, since these binary words differ in their first, second, fifth and sixth positions.

Exclusive-OR Addition

Exclusive-OR Addition, denoted ⊕, is an operation between two binary digits (bits) with the following properties:

0⊕0=0

0⊕1=1

1⊕0=1

1⊕1=0

That is, the Exclusive-OR sum of two bits is 1 when the bits differ, and 0 when they are the same. Exclusive-OR Addition is also known as symmetric difference, or modulo-2 (mod-2) sum.

Gray Code

A Gray code is a sequence of binary words of the same dimension in which adjacent words, and the first and last words are Hamming distance 1 apart. For example, the following is a Gray code of dimension 3:

000
001
011
010
110
111
101
100

Any two adjacent words, and the first and last words, differ in only one position, thereby being Hamming distance 1 apart. Such codes may be constructed for any dimension. See, M. Kraitchik, Math. Recr., Dover, N.Y. (1953) and E. N. Gilbert, Bell System Technical Journal, 37, (May, 1958).

Group

A group is a set of objects, called elements, among which an operation is defined. The operation, applied to two elements in the group, produces an element in the group. The Group operation, denoted "o", possess the following properties:

1. There is an identity element in the group, Denoted E, such that for any element A in the group E o A = A.
2. For each element B in the group, there is an inverse element in the group, denote $B^{-1}$, such that $B^{-1}$ o B = E.
3. Associativity holds, that is, if X, Y, and Z are arbitrary elements in the group, then X o (Y o Z) = (X o Y)oZ.

Subgroup

A subgroup is a subset of a group which is also a group.

Coset

A coset is a set of elements in a group formed by applying the group operation to an element of the group and each of the elements of a subgroup. For example, if M, N, O, P, Q and R form a group under the operation "o", and if P, Q, and R form a subgroup, then, the elements of a coset formed by applying the group operation to N and each of the elements of the subgroup are: N o P, N o Q, and N o R.

Linear Code

A linear code is a set of binary words of equal dimension which forms a group under component-wise Exclusive-OR addition, wherein the Hamming distance between any two words is not less than some predetermined number.

A linear code may be constructed by appending specially selected bits, called check bits, to data (information) bits. For example, a linear code of dimension 6 may be constructed from the data bits 00, 01, 10 and 11 by appending, respectively, the check bits 0000, 1101, 0111 and 1010. The resulting words, 000000, 011101, 100111 and 111010, form a group under component-wise Exclusive-OR addition; the addition of any two words in the set produces a word in the set. For example, adding the second word in the set, 011101, to the fourth word in the set, 111010, denoted 011101⊕111010, produces 100111, the third word in the set. This follows from adding the respective component of the two words: 0⊕1=1, 1⊕1=0, 1⊕1=0, 1⊕0=1, 0⊕1=1, and 1⊕0=1. Similarly, 011101⊕100111=111010, the fourth word in the set; and, 100111⊕111010=011101, the second word in the set. Taking all possible combinations of two words, one can confirm that the sum of any two words in the set produces a word in the set.

The word 000000 in the set is an identity element, that is, adding 000000 to any word in the set produces that same word. For example, 000000⊕011101=011101. Similarly, 000000⊕100111=100111. The identity property follows simply from the fact that 0⊕0=0 and 0⊕1=1, that is, addition of "0" to a bit produces that same bit.

Each word in the set serves as its own inverse, that is, adding a word to itself produces the identity element, 000000. For example, 100111⊕100111=000000; and, 111010⊕111010=000000. The inverse property follows simply from the fact that 0⊕0=0 and 1⊕1=0, that is, the addition of the same bits produces zero.

Addition of words in the set possesses the associative property; that is, for any words A, B and C in the set, A⊕(B⊕C)=(A⊕B)⊕C. For example, 011101⊕(100111⊕111010)=011101⊕011101=000000; and
(011101⊕100111)⊕111010=111010⊕111010=000000. Similarly,
000000⊕(100111⊕111010)=000000⊕011101=011101; and,
(000000⊕100111)⊕111010=100111⊕111010=011101. Associativity of addition for the words in the set follows from the associativity of addition for bits. By checking each of the eight possible combinations of bits (000, 001, 010, etc.) for associativity of addition (0⊕(0⊕0)=(0⊕0)⊕0, 0⊕(0⊕1)=(0⊕0)⊕1, etc.), the property may be verified.

Thus, the set of words forms a group under Exclusive-OR addition.

The Hamming distance between each two words in the Group is 4. For example, the Hamming distance between 011101 and 111010 is 4 since the words differ in 4 positions. Similarly, the Hamming distance between 100111 and 111010 is 4 since the words differ in 4 positions.

With the establishment of the above characteristics, the set of equal dimension binary words so constructed is seen to be a linear code, that is a group under component-wise Exclusive-OR addition with a predetermined minimal distance between words.

A linear code contrived in this fashion is denoted a linear (n, k, d) code, where n = the dimension of a word, k = the number of data bits in a word, and d = the minimum Hamming distance between words. There are a total of $2^k$ words in such a linear code. This follows from the fact that the code words are constructed by appending n−k suitably selected check bits to each of the $2^k$ data words generated from the k data bits.

A location in computer memory can be designated by n bits; by varying the bits a total of $2^n$ such sites may be specified. In accordance with the principles of the present invention, these addresses are derived from a linear (n, k, d) code and a Gray code of dimension n.

In each of the $2^k$ words of dimension n of the linear (n, k, d) code, the k data bits occupy the same positions.

The Gray code of dimension n utilized in the invention is generated by augmenting each of the $2^{n-k}$ words of an n−k dimension Gray code with k zeros. The k zeros occupy the same positions in each of the resulting words of dimension n, and these positions correspond to those of the k data bits in the linear (n, k, d) code words.

Since adjacent words in the n−k dimension Gray code are Hamming distance 1 apart, and the augmenting zeros add no distance, the resulting, adjacent n dimensional words are also Hamming distance 1 apart, thereby forming another Gray code.

The $2^n$ addresses, each consisting of n bits, are derived from the linear (n, k, d) code and the Gray code of dimension n in the following manner: the first $2^k$ addresses correspond to the words produced by adding the first Gray code word to every linear code word. The second $2^k$ addresses correspond to the words produced by adding the second Gray code word to each of the words of the linear code. Similarly, the third and subsequent groups of $2^k$ addresses correspond, respectively, to the words produced by adding the third and subsequent Gray code words to each of the $2^k$ linear code words. The initial ordering of the linear (n, k, d) code words to which Gray code words are added, is arbitrary; but, once selected, must be maintained when producing the groups of $2^k$ words to which the addresses correspond. There being $2^{n-k}$ Gray code words, and $2^k$ linear code words, a total of $2^{n-k} \cdot 2^k = 2^n$ addresses are designated in this fashion.

The above description may be equivalently, but more succinctly stated mathematically. Denote by $c_i, 0 \leq i \leq 2^k - 1$, the words of the linear (n, k, d) code, and denote by $g_i, 0 \leq i \leq 2^{n-k} - 1$ the words of the Gray code of dimension n. An arbitrary, but fixed, address index i, which indicates the position of an address in the sequence of $2^n$ addresses, can be written as $i = i_0 \cdot 2^k + i_1$ for some unique $i_1$, where $0 \leq i_1 \leq 2^{k-1}$, and some unique $i_0$, where $0 \leq i_0 \leq 2^{n-k} - 1$. The $i^{th}$ address, $a_i$, is then given by $a_i = g_{i0} \oplus c_{i1}$.

There are $2^n$ addresses produced in the manner described above and all of these addresses can be shown to be distinct as follows:

The set of all binary words of dimension n forms a group under Exclusive-OR addition: the addition of any two such words produces a word in the set. The identity element, as before, is the 000000 word; and, the inverse of a given word in the set, as before is the word itself. Associativity follows from the associativity of Exclusive-OR addition of bits. The words of the linear (n, k, d) code are elements of this group, and by definition form a subgroup thereof. The words of the Gray code of dimension n are also elements of the group. Each set of $2^k$ addresses formed by adding a Gray code word to each of the words of the linear code is a coset of the linear code, that is, each such set of $2^k$ addresses is formed by adding an element of the group (a Gray code word) to each element of a subgroup (the linear n, k, d) code word). It is well known that the members of two cosets are either identical or disjoint. See Birkhoff and MacLane, A survey of Modern Algebra, MacMillan Co., N.Y. To show that the $2^n$ constructed addresses are all distinct, the cosets may be shown to be mutually disjoint. This is achieved by demonstrating that each coset contains a member that no other coset possesses. Since a particular coset cannot, therefore, be identical to the other cosets, it must, by algebraic theory, be disjoint from each of the other cosets. This being true for every coset, the cosets are established to be mutually disjoint, and the members of all the cosets (the $2^n$ addresses) are thereby distinct. The following demonstrates that each coset contains a member possessed by no other coset:

The word in each coset formed by adding the associated Gray code word to the identity element, 00 000, of the linear (n, k, d) code is the required member of the coset that no other coset possesses. This member is equal to, of course, the Gray code word itself. It cannot equal the analogous Gray code word member of a different coset, since different Gray code words correspond to different cosets. Also, it cannot equal any other member of this different coset, since the Gray code word possesses zeros in the k data positions; and each such other member has k data bits that are not all zero.

Thus, each coset has a member contained in no other coset, and by the logic above, all $2^n$ members (addresses) are therefore distinct.

The Hamming distance between any two addresses $a_i$ and $a_j$, denoted $d(a_i, a_j)$ is just the Hamming weight of their Exclusive-OR sum, denoted $w(a_i \oplus a_j)$. This follows from the observation that the Exclusive-OR sum of two words produces a word with 1's in the positions where the bits in the words differ, and 0's in the positions where they are the same. The weight of the resulting word is simply the number of positions where the two words differ, which is the Hamming distance between the words. Thus, $d(a_i, a_j) = w(a_i \oplus a_j)$.

Each address is the sum of a Gray code word and a linear (n, k, d) code word. Accordingly $a_i = g_{i0} \oplus c_{i1}$, and $a_j = g_{j0} \oplus c_{j1}$. Substituting in the above expressions:

$$d(a_i, a_j) = w(a_i \oplus a_j) = w(g_{i0} \oplus c_{i1} \oplus g_{j0} \oplus c_{j1}).$$

Exclusive-OR addition of bits is commutative, that is, if A and B are bits $A \oplus B = B \oplus A$, as is readily verified. Accordingly, Exclusive-OR addition of words is also commutative. Thus, $$g_{j0} \oplus c_{j1} = c_{j1} \oplus g_{j0}$$

so that $$w(g_{i0} \oplus c_{i1} \oplus g_{j0} \oplus c_{j1}) = w(g_{i0} \oplus c_{i1} \oplus c_{j1} \oplus g_{j0}).$$

The c terms are elements of the linear (n, k, d) code which is a group; thus, $c_{i1} \oplus c_{j1}$ is also an element of the group, and is denoted $c_{ij}$. So, $$w(g_{i0} \oplus c_{i1} \oplus c_{j1} \oplus g_{j0}) = w(g_{i0} \oplus c_{ij} \oplus g_{j0}),$$

which, by communitivity, $= w(g_{i0} \oplus g_{j0} \oplus c_{ij})$. Since $c_{i1}$ and $c_{j1}$ are elements of the linear (n, k, d) code, if they are not identical, they are at least Hamming distance d apart, which, as noted above, means that the Hamming weight of their sum is at least d. If the addresses $a_i$ and $a_j$ are members of the same coset then the Gray code words $g_{i0}$ and $g_{j0}$ are identical, and thus $$w(g_{i0} \oplus g_{j0} \oplus c_{ij}) = w(00 \ldots 0 \oplus c_{ij}) = w(c_{ij}) \geq d,$$
$$(c_{i1} \neq c_{j1}).$$

If $g_{i0}$ and $g_{j0}$ are adjacent words in the Gray code, then they are Hamming distance 1 apart, and accordingly $g_{i0} \oplus g_{j0}$ is a word with Hamming weight one, denoted $u_{ij}$. The word $u_{ij}$ possesses a single one among its components, and the addition, therefore, of $u_{ij}$ to a second word produces a third word whose weight differs by at most one from that of the second word. Thus, $$d(a_i, a_j) = w(u_{ij} \oplus c_{ij}) \geq d - 1,$$

unless $c_{i1} = c_{j1}$, that is, unless $i_1 = j_1$, in which event, $$d(a_i, a_j) = w(u_{ij} \oplus 00 \ldots 0) = w(u_{ij}) = 1.$$

However, due to the identical ordering of linear code words within a coset, $c_{i1} = c_{j1}$ only when the addresses are $2^k$ apart in sequence. Thus, $d(a_i, a_j) = 1$ when $|i - j| = 2^k$, and $d(a_i, a_j) \geq d - 1$ for $|i - j| \leq 2^k$. That is, addresses less than $2^k$ positions from a given address in the sequence of addresses are at least Hamming distance $d - 1$ from the given address. Accordingly, should data be assigned to an erroneous address, and should the error involve an alteration of fewer than $d - 1$ bits in the intended address, then this data will be sent to some address outside the range of $2^k - 1$ addresses that lie on either side of the intended address in the sequence of addresses. Thus, data assigned to addresses constructed in accordance with the principles of the present invention will not overwrite relatively new data that has been assigned to addresses whose indices are less than $2^k$ from the index of the intended address, when an error occurs that affects fewer than $d-1$ bits of the intended address.

Each instance of the invention requires a choice of the numbers n and k and the particular linear (n, k, d) code to be used. The number n corresponds to the dimension of the computer or memory address involved. The bound $d-1$ determines the number of errors that may be tolerated without overwrite of data in addresses whose indices are less than $2^k$ from that of the index of the intended address. Accordingly, the selection of a linear code is predicated upon the probability of addressing errors and the interval in the address sequence that is to be safe guarded against overwrite. The relationship between the bounds $2^k$ and $d-1$ is complex, and recourse to tables of best available linear codes is advisable. See, for example, MacWilliams, F. J. and Sloane, N. J. A., The Theory of Error-Correcting Codes, Appendix A, North-Holland Publishing Company, Amsterdam, N.Y., Oxford (1978).

Linear codes suitable for use with many present computers comprise the (16, 11, 4) extended Hamming code, the (n, n−10, 5) BCH codes where $24 \leq n \leq 32$, and the (24, 12, 8) extended Golay code. See, the theory of Error-Correcting codes, supra.

Referring to FIG. 1, the above principles are incorporated into a preferred embodiment of the present invention. The address index i, which represents the position of an address in the sequence of addresses, is loaded into an address index input register 1. Preferably, the address index i is loaded into address index input register 1 in its binary equivalent form, that is, the number i is converted to binary and then loaded. The loading may be performed in serial or in parallel fashion. The higher order $n-k$ bits of the register 1 are utilized by an $n-k$ dimension Gray coder 2 to generate the appropriate Gray code word. The lower order k bits of the register 1 are utilized by a linear (n, k, d) coder to generate the appropriate linear code word comprising k information bits and $n-k$ check bits. The output of the linear (n, k, d) coder 3 is sent to an array of n Exclusive-OR Gates 4 such that each gate is furnished one bit of the linear code word. The output of the Gray coder 2 is sent to the array 4, such that $n-k$ gates receiving, respectively, the $n-k$ check bits of the linear code word also receive, respectively, the $n-k$ bits of the Gray code word. A zero filler 5 furnishes k zeros to, respectively, the k gates of the array 4 which are receiving, respectively, the k information bits of the linear code word. The gates of the array 4 and the bits which have been supplied thereto, producing an address in the sequence.

The embodiment comprises readily available, well-known components: registers 1, Gray coders 2, linear coders 3, Exclusive-OR gates 4, addressing means 6 and memory 7.

Loading the register 1 with the address index in binary equivalent form is particularly advantageous. Referring to FIG. 2, the address indices 0 through 31 have been converted to their binary equivalents. The case n=5, k=2 is illustrative. The lower order 2 bits in the register 1 are sent to the Linear coder 3 and provide, unchanged, the data bits to which check bits are appended by the linear coder to produce the linear (n, k, d) code words. The higher order 3 bits of register 1 are sent to the Gray coder 2. The higher order 3 bits remain the same for all $2^2 = 4$ data words. For example, the higher order 3 bits corresponding to the first four data words, 00, 01, 10, 11 is 000. Similarly, 001 corresponds to the next four repeating data words, and 010 to the subsequent set of 4 data words. For each of the 4 data words sent from the register 1 to the linear coder 3, a single word is sent from the register 1 to the Gray coder 2. This single word changes when a new cycle of the data words commences and the change conforms to the consecutive ordering of 3 bit binary numbers.

In general, it can be shown that for a sequence of n bit binary numbers arranged in consecutive order, the higher order $n-k$ bits remain constant as the lower order k bits cycle through their consecutive $2^k$ numbers. The higher order $n-k$ bits change in the consecutive order of $n-k$ bit binary numbers. Accordingly, loading register 1 with the address indices in binary form is inherently advantageous; as the index i increases, the lower order k bits of the register 1 cyclically generate $2^k$ words which are utilized, unchanged, by the linear (n, k, d) coder 3 as the data bits from which $2^k$ linear code words are cyclically generated by appending $n-k$ check bits. Further, the constancy of the higher order $n-k$ bits of the register 1 for all $2^k$ words in a cycle of the lower order k bits facilitates utilization by the Gray coder 2 of these $n-k$ bits; since, such constancy comports with the requirement that the same Gray code word be generated for each of the $2^k$ linear code words to which it is added.

In accordance with the principles of the present invention, any means may be utilized for cyclically generating $2^k$ linear (n, k, d) code words wherein each word comprises k data bits and $n-k$ check bits, the k data bits occupying the same positions in each word. Any means may be utilized for generating a sequence comprising words of a Gray code of dimension $n-k$, wherein an individual Gray code word occurs consecutively $2^k$ times, and distinct Gray code words occur in the order in which they appear in the Gray code. Further, any means may be utilized for performing Exclusive-OR addition of the various bits generated by the invention. Any addressing means 6 may be used to route the output of the Exclusive-OR gates to specified locations in memory 7.

While the invention has been described in its preferred embodiments, it is to be understood that the words which have been used are words of description rather than limitation and that changes may be made within the purview of the appending claims without departing from the true scope and spirit of the invention in its broader aspects.

We claim:

1. Apparatus for providing a sequence of address signals to an addressing means of a digital computer, wherein said addressing means accesses locations in memory of said digital computer, comprising:

address index input register for accepting an address index input and for providing a first signal comprising $n-k$ bits and a second signal comprising k bits, linear code sequence means for accepting said second signal and for generating a sequence of n dimensional binary words, said sequence comprising a repeating cycle of $2^k$ linear (n, k, d) code words, each linear code word comprising k data bits and $n-k$ check bits, said k data bits occupying the same positions in each linear code word;

Gray code sequence means for accepting said first signal and for generating a sequence of $n-k$ dimensional binary words, said sequence of n−k dimensional binary words comprising words of a Gray code of dimension n−k, an individual Gray code word occurring consecutively $2^k$ times, and distinct Gray code words occurring in the order in which they appear in said Gray code;

zero filler means for generating a sequence of k dimensional binary words, each of said k dimensional binary words comprising k zero bits; and Exclusive-OR additional means, coupled to receive said linear code sequence means generated n-dimensional binary words, said Gray code sequence means generated n−k dimensional binary words and said zero filler means generated k dimensional binary words for performing Exclusive-OR addition of the members of said sequence of n−k dimensional binary words to, respectively, said n−k check bits of the members of said sequence of n dimensional binary words, and for performing Exclusive-OR addition of the members of said sequence of k dimensional binary words to, respectively, said k data bits of the members of said sequence of n dimensional binary words, output of said Exclusive-OR addition means comprises said sequence of address signals whereby said address signals are applied to said addressing means for accessing said locations of said memory in accordance with said address signals.

2. An apparatus as in claim 1 wherein said linear code sequence means comprises a linear (n, k, d) coder.

3. An apparatus as in claim 1 wherein said Gray code sequence means comprises an n−k dimensional Gray coder.

4. An apparatus as in claim 1 wherein said Exclusive-OR addition means comprises n Exclusive-OR gates.

5. An apparatus as in claim 2 wherein said Gray code sequence means comprises an n−k dimensional Gray coder.

6. An apparatus as in claim 5 wherein said Exclusive-OR addition means comprises n Exclusive-OR gates.

7. An apparatus as in claim 1 wherein said linear (n, k, d) code is a (16, 11, 4) extended Hamming code.

8. An apparatus as in claim 6 wherein said linear (n, k, d) code is a (16, 11, 4) extended Hamming code.

9. An apparatus as in claim 1 wherein said linear (n, k, d) code is a (24, 12, 8) extended Golay code.

10. An apparatus as in claim 6 wherein said linear (n, k, d) code is a (24, 12, 8) extended Golay code.

11. An apparatus as in claim 1 wherein said linear (n, k, d) code is an (n, n−10, 5) BCH code where $24 \leq n \leq 32$.

12. An apparatus as in claim 6 wherein said linear (n, k, d) code is an (n, n−10, 5) BCH code where $24 \leq n \leq 32$.

13. Apparatus for providing a sequence of address signals to an addressing means of a digital computer, wherein said addressing means accesses locations in memory of said digital computer, comprising:

address index input register means for sequentially loading with address indices in consecutive order in n dimensional binary equivalent word form with a higher order n−k bits and a lower order k bits and for providing a first signal of higher order n−k bits and a second signal of lower order k bits, linear coder means, coupled to said register means, for accepting said second signal and for generating a sequence of linear (n, k, d) code words from the lower order k register bits of said indices, by utilizing said lower order k register bits of individual address indices as k data bits to which n−k generated check bits are appended to form corresponding linear (n, k, d) code words, said k data bits occupying the same positions in each linear (n, k, d) code word;

Gray coder means, coupled to said register means, for accepting said first signal and for generating a sequence comprising words of a Gray code of dimension n−k, by utilizing the higher order n−k register bits of individual address indices to generate a corresponding Gray code word;

zero filler means for generating a sequence of k dimensional binary words, each of said K dimensional binary words comprising K zero bits; and Exclusive-OR addition means, coupled to receive said linear coder means generated code words, said Gray coder means generated code words and said zero filler means generated binary words for performing Exclusive-OR addition of the members of said sequence comprising words of a Gray code of dimensions n−k to, respectively, said n−k check bits of the members of said sequence of linear (n, k, d) code words, and for performing Exclusive-OR addition of the members of said sequence of k dimensional binary words to, respectively, said k data bits of the members of said sequence of linear (n, k, d) code words, output of said Exclusive-OR addition comprises said sequence of address signals whereby said address signals are means applied to said addressing means for accessing said locations of said memory in accordance with said address signals.

14. An apparatus as in claim 13 wherein said linear coder means comprises a linear (n, k, d) coder.

15. An apparatus as in claim 13 wherein said Gray coder means comprises an n−k dimensional Gray coder.

16. An apparatus as in claim 13 wherein said Exclusive-OR additional means comprises n Exclusive-OR gates.

17. An apparatus as in claim 14 wherein said Gray coder means comprises an n−k dimensional Gray coder.

18. An apparatus as in claim 17 wherein said Exclusive-OR addition means comprises n Exclusive-OR gates.

19. An apparatus as in claim 13 wherein said linear (n, k, d) code comprises a (16, 11, 4) extended Hamming code.

20. An apparatus as in claim 18 wherein said linear (n, k, d) code comprises a (16, 11, 4) extended Hamming code.

21. An apparatus as in claim 13 wherein said linear (n, k, d) code comprises a (24, 12, 8) extended Golay Code.

22. An apparatus as in claim 18 wherein said linear (n, k, d) code comprises a (24, 12, 8) extended Golay code.

23. An apparatus as in claim 13 wherein said linear (n, k, d) code comprises an (n, n−10, 5) BCH code where $24 \leq n \leq 32$.

24. An apparatus as in claim 18 wherein said linear (n, k, d) code comprises an (n, n−10, 5) BCH code where $24 \leq n \leq 32$.

* * * * *